(No Model.)
G. F. EBERLE.
THILL COUPLING.
No. 491,774. Patented Feb. 14, 1893.
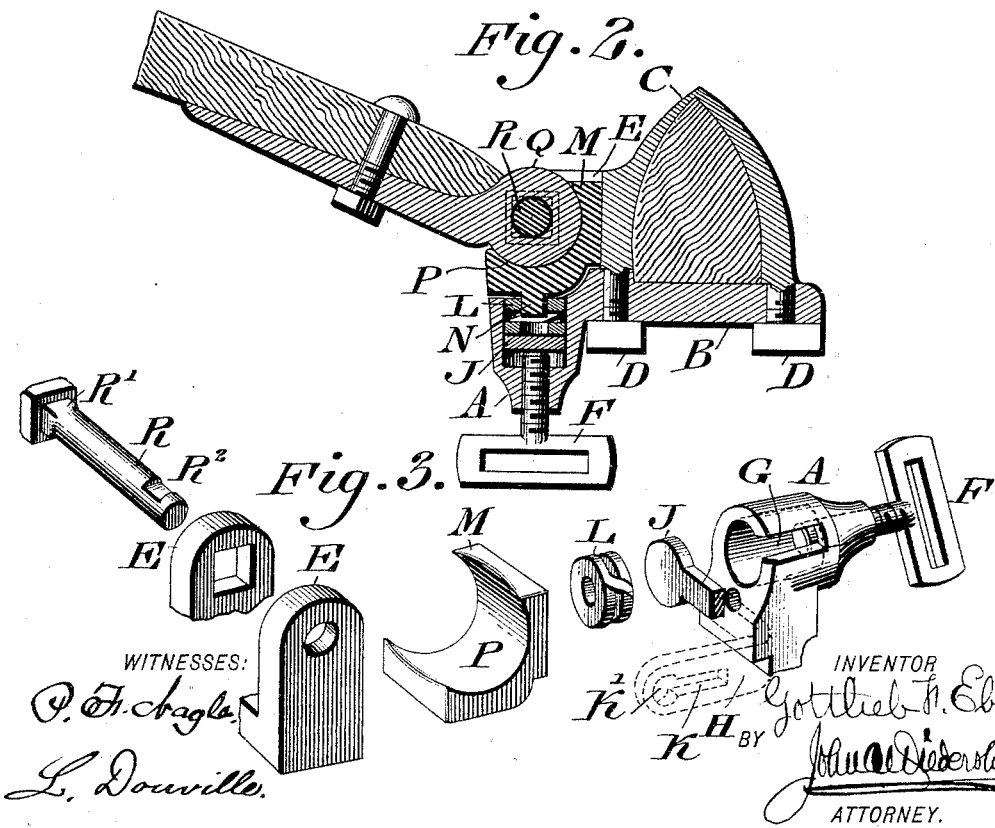

UNITED STATES PATENT OFFICE.

GOTTLIEB F. EBERLE, OF PHILADELPHIA, PENNSYLVANIA.

THILL-COUPLING.

SPECIFICATION forming part of Letters Patent No. 491,774, dated February 14, 1893.

Application filed May 3, 1892. Serial No. 431,621. (No model.)

*To all whom it may concern:*

Be it known that I, GOTTLIEB F. EBERLE, a citizen of the United States, residing in the city and county of Philadelphia, State of Pennsylvania, have invented a new and useful Improvement in Shaft or Thill Couplings, which improvement is fully set forth in the following specification and accompanying drawings.

My invention consists of an improvement in shaft or thill couplings, whereby the proper pressure is provided for the eye of the coupling, and rattling of the parts is prevented.

It further consists of means substantially as described for locking the axial bolt of the coupling.

Figure 1 represents a perspective view of a thill coupling embodying my invention. Fig. 2 represents a longitudinal section thereof. Fig. 3 represents a perspective view showing the parts separated.

Similar letters of reference indicate corresponding parts in the several figures.

Referring to the drawings: A designates a socket which is provided with a projecting arm B, the latter being secured to the axle by means of a clip C and bolts D. Projecting from said clip are ears E, one of the openings of one of which being angular, and that of the other being circular.

F designates a thumb screw which passes through the rear of the socket into the interior of the same. In the side of the socket is a slot G to receive one limb of the bent arm or elbow H, said limb carrying a head J, which is fitted within the socket and is adapted to have the point of the screw F bear against the same. The other limb of the elbow H has an elongated slot K, one end of which is enlarged and circular as at K', the circular portion of said slot being adapted to coincide in position with the circular opening of the adjacent ear E.

Within the socket A is a coiled spring L, which is interposed between the head J and a washer or block M, the latter having on its underside a stud N, which enters the central opening of the spring L, and is formed with a curved face P, which is in contact with the outer face of the wall of the eye Q of the coupling.

R designates the axial bolt which is passed through the ears E and through the eye Q, it having a squared portion R' to engage with the angular opening in one of the eyes, whereby rotation of the bolt is prevented. At the end of the bolt opposite to the head are recesses R², the walls of which are adapted to engage with the walls of the elongated slot K in the elbow H, after having been inserted in the circular end K' thereof. It will be seen that when the screw F is tightened, pressure is exerted on the spring L and washer M, and the same is communicated to the eye Q of the coupling. As the elbow H is advanced by the action of the screw, the recessed portion of the bolt R enters the slot K of the elbow, thus locking said bolt to the elbow and preventing its outward motion or disconnection therefrom. It will also be seen that the washer M provides the proper friction for the eye Q, and prevents rattling of the parts, and while it is seated against said eye it is enabled to yield, owing to the action of the spring L on the back thereof.

Having thus described my invention, what I claim as new, and desire to secure by Letters Patent, is—

1. A thill coupling, a socket having an arm for connecting it with an axle, a screw adjustable in said socket, an arm with a limb having a head in said socket, and a limb with slot for engagement with the axial bolt of the coupling, said screw bearing against said head, said parts being combined substantially as described.

2. A thill coupling having a bolt passed through the eye and ears of said coupling, a sliding elbow engaging with said bolt in order to lock the same, a socket carrying said elbow, and a screw fitted to said socket and bearing one limb of said elbow, said parts being combined substantially as described.

3. In a thill coupling, a socket having a screw fitted thereto, a spring located therein, and a block between said socket and coupling, in combination with an elbow having a head within the socket between said screw and spring, the outer limb of said elbow engaging the axial bolt of the coupling, in order to lock the same and prevent withdrawal thereof, substantially as described.

4. In a thill coupling, a movable arm or elbow connected with the coupling and engaging with the axial bolt, in order to lock the same after its location in the eye of the coupling, substantially as described.

5. In a thill coupling, a socket with a slot in its side, an arm with head in said socket, and one end provided with a slot having a circular recess at one end, a pivotal pin for the coupling eye having a reduced portion, a spring in said socket, and a tightening screw, said parts being combined substantially as described.

GOTTLIEB F. EBERLE.

Witnesses:
JOHN A. WIEDERSHEIM,
WM. C. WIEDERSHEIM.